(No Model.)
J. M. BAKER.
SIGNAL FOR TELEPHONE INSTRUMENTS.
No. 373,043. Patented Nov. 15, 1887.
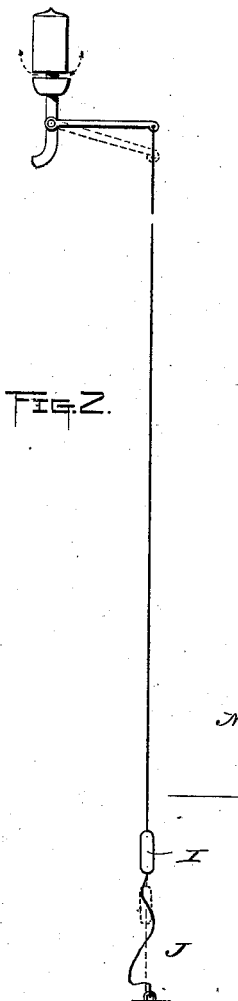
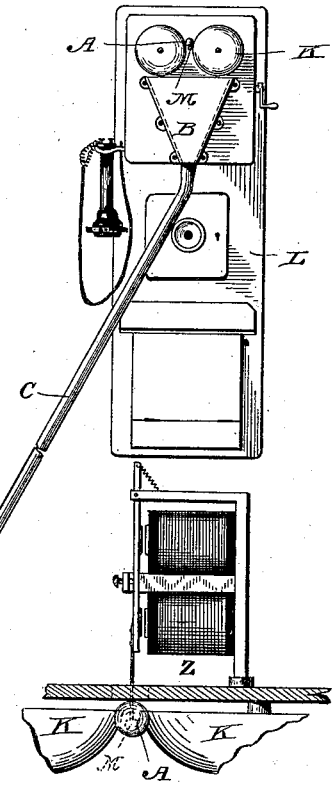
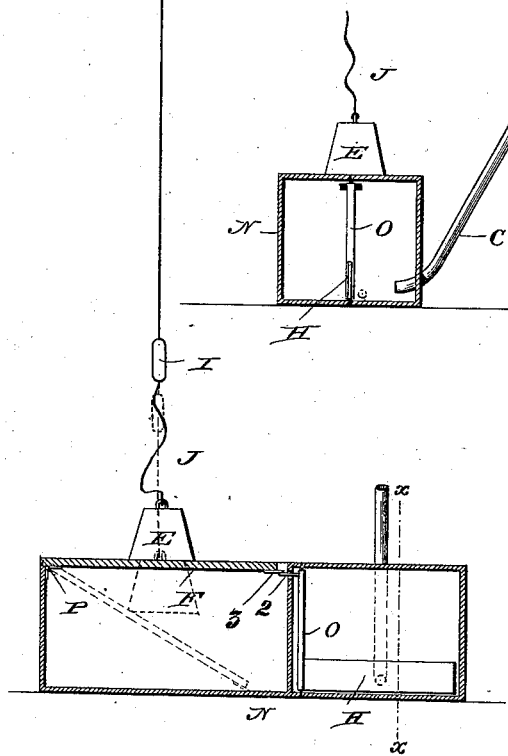
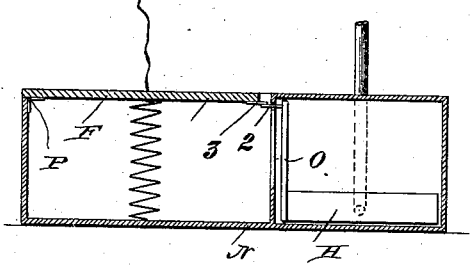
Witnesses
Inventor:
John M. Baker.
By his Attorney
J. C. Higdon

UNITED STATES PATENT OFFICE.

JOHN M. BAKER, OF PAOLA, KANSAS.

SIGNAL FOR TELEPHONE-INSTRUMENTS.

SPECIFICATION forming part of Letters Patent No. 373,043, dated November 15, 1887.

Application filed April 22, 1887. Serial No. 235,728. (No model.)

*To all whom it may concern:*

Be it known that I, JOHN M. BAKER, of Paola, Miami county, State of Kansas, have invented a new and useful Signal for Telephone-Instruments, of which the following is a full, clear, and exact description, reference being had to the accompanying drawings, forming a part thereof.

My invention relates to an improvement in signals for telephones and electrical annunciators; and the object is to provide a device which can be used in combination with a telephone call-bell or similar instrument for the purpose of giving an increased additional alarm in places where the surrounding noise is so great that the ordinary telephone call-bell cannot be distinctly heard.

With these ends in view my invention consists in certain novel features of construction and combinations of parts, more fully described hereinafter, and pointed out in the claims.

Referring to the accompanying drawings, Figure 1 represents my complete device in combination with a telephone, the trap and releasing mechanism being shown in cross-section through line $x\ x$, Fig. 2. Fig. 2 represents a longitudinal section of the trap and releasing mechanism; Fig. 3, a detail showing the electro-magnet or rheotome mechanism for starting the weight, and Fig. 4 a modification of the trap for releasing the auxiliary weight.

The letter L represents an ordinary telephone, to which my device is attached, and K the usual alarm-bells secured thereto, and which are operated by any suitable vibrating magnetic device, such as Z.

Upon the clapper M is loosely placed a ball or suitable weight, A, so poised or adjusted that when the clapper vibrates it will roll or fall by gravity into a funnel-shaped receptacle, B, located below. A pipe or tube, C, communicates with the bottom of said receptacle, which pipe has a diameter sufficient to allow the ball free passage through it, and it extends downward to a box or receptacle, N, and terminates just in front of a lever or trigger, H. Said trigger is attached to one end of a vertical shaft or spindle, O, journaled in the top and bottom of the box N. The upper end of the spindle is provided with a projecting pin, 2, which loosely supports a pin, 3, projecting from the free end of a trap-door, F, by means of which the door is held in elevated adjustment, the door being also hinged to one end, P, of the box.

E is an auxiliary weight resting upon the door. To this weight is fastened a cord, wire, or chain, J, which may be attached to any suitable actuating mechanism for blowing a whistle, striking a gong, &c. In order to keep the rope J taut, it is provided with a weight, I, fastened just above the weight E, to prevent the latter from having too much play when the trap is sprung.

Instead of employing a weight, E, the cord J might be attached directly to the trap-door F, and a retracting-spring be stretched between the trap-door and bottom of the box, as shown in Fig. 4; but the gravitating weight is preferred.

The construction of my device having been set forth, I will now proceed to describe its operation: The ball A, which has been previously placed in loose contact upon the clapper M, is set free or given an initial movement by the vibration of the clapper when some one is calling, and the moment the ball thus becomes liberated it rolls from between the surfaces of the gongs and descends into the hopper B, thence through the tube C, and dashes against the free end of the trigger H with sufficient force to rotate the vertical shaft O, thereby disengaging the pins 2 and 3, releasing the trap-door F, dropping the auxiliary weight E, pulling the cord J, as shown by dotted lines in Fig. 2, and creating an additional increased alarm. If the auxiliary weight is attached to a steam-whistle, the latter will continue to blow until some one raises the weight to its former position. When this is done, the ball may be taken from the box and placed in its former position upon the clapper A, the trap reset, and the device will be ready to repeat the operation.

It is evident that numerous slight changes might be made in the construction and arrangement of parts herein described without departing from the scope and spirit of my invention; hence I do not wish to limit myself to the precise arrangement shown, as my device could be used successfully in connection with various kinds of signaling devices.

Having fully described my invention, what

I claim as new, and desire to secure by Letters Patent, is—

1. In an electrical indicator or similar instrument, an electro-magnetic device provided with a loose weight, in combination with a trap supporting an auxiliary weight, said trap being operated by the fall of said loose weight, substantially as described.

2. The combination, in an electrical indicator or similar instrument, of a loose weight operated by an electro-magnetic device, a hopper into which said weight is adapted to fall, a tube communicating with the hopper, and an alarm-actuating trap adapted to be sprung by the momentum of said weight, substantially as and for the purpose described.

3. The combination of an electro-magnetic device, a movable weight adapted to be released thereby, a trap provided with a trigger adapted to be operated by the fall of said weight, means, substantially as described, for guiding the descending weight against said trigger, and an auxiliary weight adapted to be dropped by the action of said trigger, all arranged and adapted to operate as described.

4. In an electrical indicator or similar instrument, a pair of gongs, K, provided with a clapper, M, and a ball loosely retained between the gongs upon said clapper, in combination with a hopper, B, guiding-tube C, pivoted trigger H, trap-door F, pins 2 and 3, and auxiliary weight E, substantially as described.

In testimony whereof I affix my signature in presence of two witnesses.

JOHN M. BAKER.

Witnesses:
SPERRY BAKER,
H. S. MAYNARD.